Aug. 31, 1948. A. O. OLAFSON 2,448,113
TRAFFIC ACTUATED SIGNAL CONTROLLER
Filed March 14, 1946 8 Sheets-Sheet 2

Inventor
Alvin O. Olafson
Robert M. Dunning
Attorney

Inventor
Alvin O. Olafson
By Robert M. Dunning
Attorney

Aug. 31, 1948.　　　　A. O. OLAFSON　　　　2,448,113
TRAFFIC ACTUATED SIGNAL CONTROLLER
Filed March 14, 1946　　　　　　　　　　　　　　8 Sheets-Sheet 4

Inventor
Alvin O. Olafson
By Robert M. Dunning
Attorney

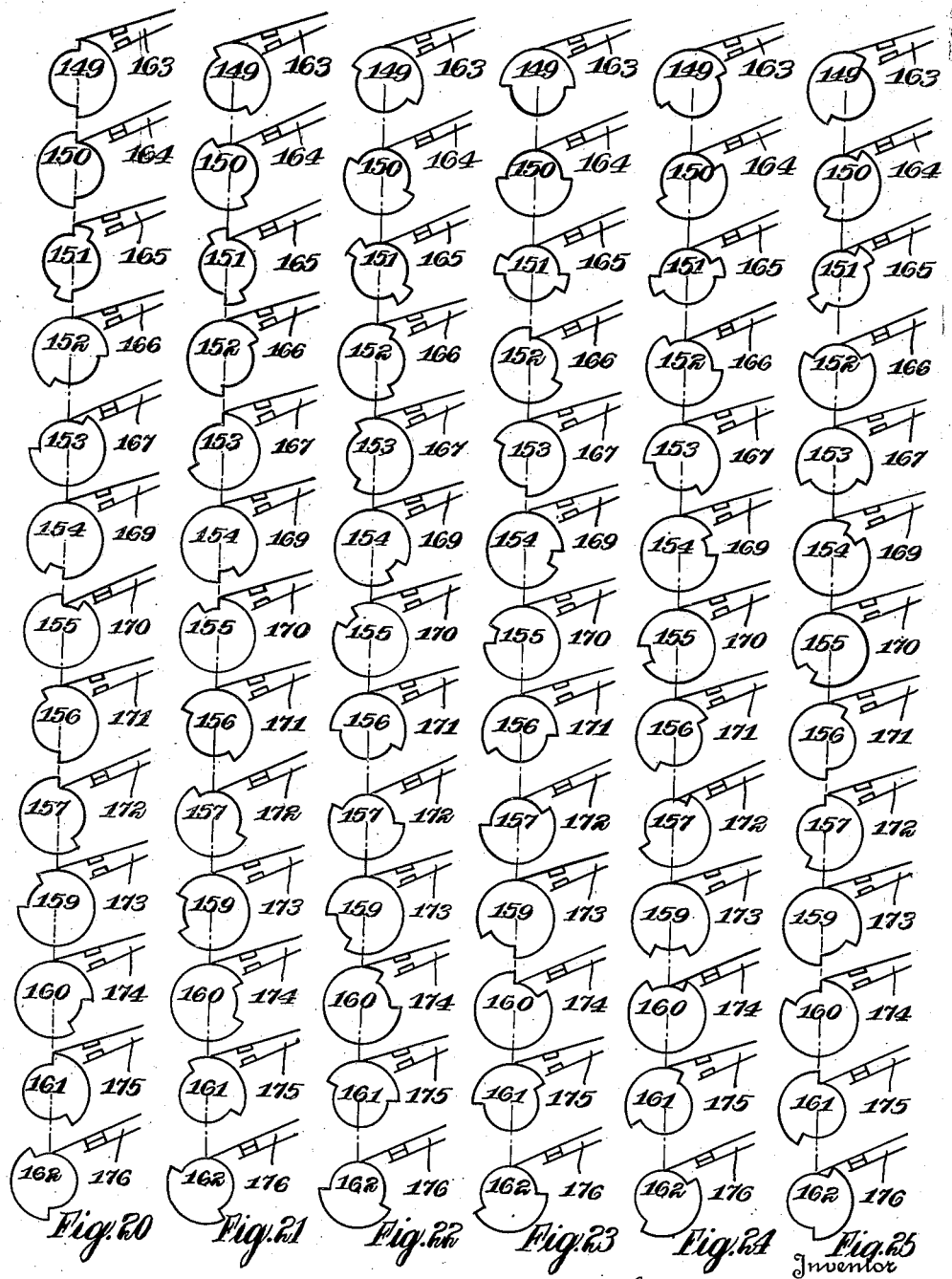

Aug. 31, 1948.   A. O. OLAFSON   2,448,113
TRAFFIC ACTUATED SIGNAL CONTROLLER
Filed March 14, 1946   8 Sheets-Sheet 8

Inventor
Alvin O. Olafson
By Robert M. Dunning
Attorney

Patented Aug. 31, 1948

2,448,113

UNITED STATES PATENT OFFICE 2,448,113

TRAFFIC ACTUATED SIGNAL CONTROLLER

Alvin O. Olafson, St. Paul, Minn.

Application March 14, 1946, Serial No. 654,323

20 Claims. (Cl. 177—337)

1

My invention relates to an improvement in traffic actuated signal controller wherein it is desired to provide a means actuated by traffic approaching an intersection for controlling signal lights at the intersection.

Previous patents have issued on controllers operable by traffic to control traffic signals. Most of these, however, have been extremely complicated in construction and become easily injured or out of adjustment. Furthermore many of these controllers are so arranged that when the signal is prolonged by continuing traffic, the periods of prolongation are relatively large.

It is an object of the present invention to provide a traffic signal controller which is relatively simple in construction and which may be built of many standard parts which are not likely to get out of adjustment or need repair. While the particular arrangement and location of these parts is believed entirely novel, the switches and solenoid devices employed are of a standard type and are of proven construction.

A feature of the present invention resides in the fact that but little power is required to actuate the apparatus. When no vehicles are approaching the intersection, the only current being used is that required to illuminate the signals and to operate a small motor which need be of sufficient power only to actuate a pair of rotating switch actuating discs.

A further feature of the present invention resides in the fact that my traffic signal controller may be actuated to be fully automatic, semi-automatic, or fully traffic actuated. In other words, the controller may be set to change the signals in response to vehicle actuation on both highways in which case the signal is fully traffic actuated; in response to vehicle actuation one highway only, in which case the signal is semi-traffic actuated; or automatically at predetermined intervals without actuation by vehicles. Furthermore, either of the intersecting streets may comprise the through street or arterial highway.

A feature of the present invention resides in providing a controller which will award a variable initial "Go" display period for each highway and a variable prolonging period for each highway. The initial period may be adjusted to satisfy the requirements of a single vehicle approaching the intersection. The prolonging period may be adjusted to provide a maximum period through which the "Go" signal on either highway may be prolonged.

An important feature of the present invention resides in the provision of a means for producing

2 electrical impulses, and in using these impulses to actuate the time after actuation thereof. A timer prolonging means, operable step by step, is advanced either by vehicles approaching the intersection, or by impulses produced within the controller. A timer resetting means, advanced at regular intervals by impulses produced within the timer, attempts to "catch up" with the advancing timer means, and to return the timer means to starting position. When the resetting means overtakes the timer means, the timer means is reset, and the "Go" signal displayed on a corresponding highway may be relinquished.

These and other objects and novel features of my invention will be more clearly and fully set forth in the following specification and claims.

In the drawings forming a part of my specification:

Figures 14 through 25 are figures showing the relative positions of the cams and their switches in different angular positions of the cams.

Figure 26:
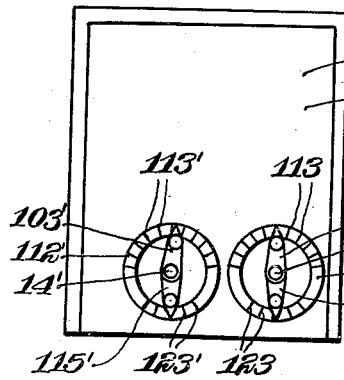
Figure 26 is an elevational view of the controller in its cabinet.

My controller is composed of several essential units which are electrically connected together. As they are electrically connected, the respective positions of these units is not important in the present invention and the apparatus has been shown in assembled form only in Figure 1 of the drawings. The controller is usually mounted in a cabinet A, as best illustrated in Figure 26 of the drawings.

Figure 1:
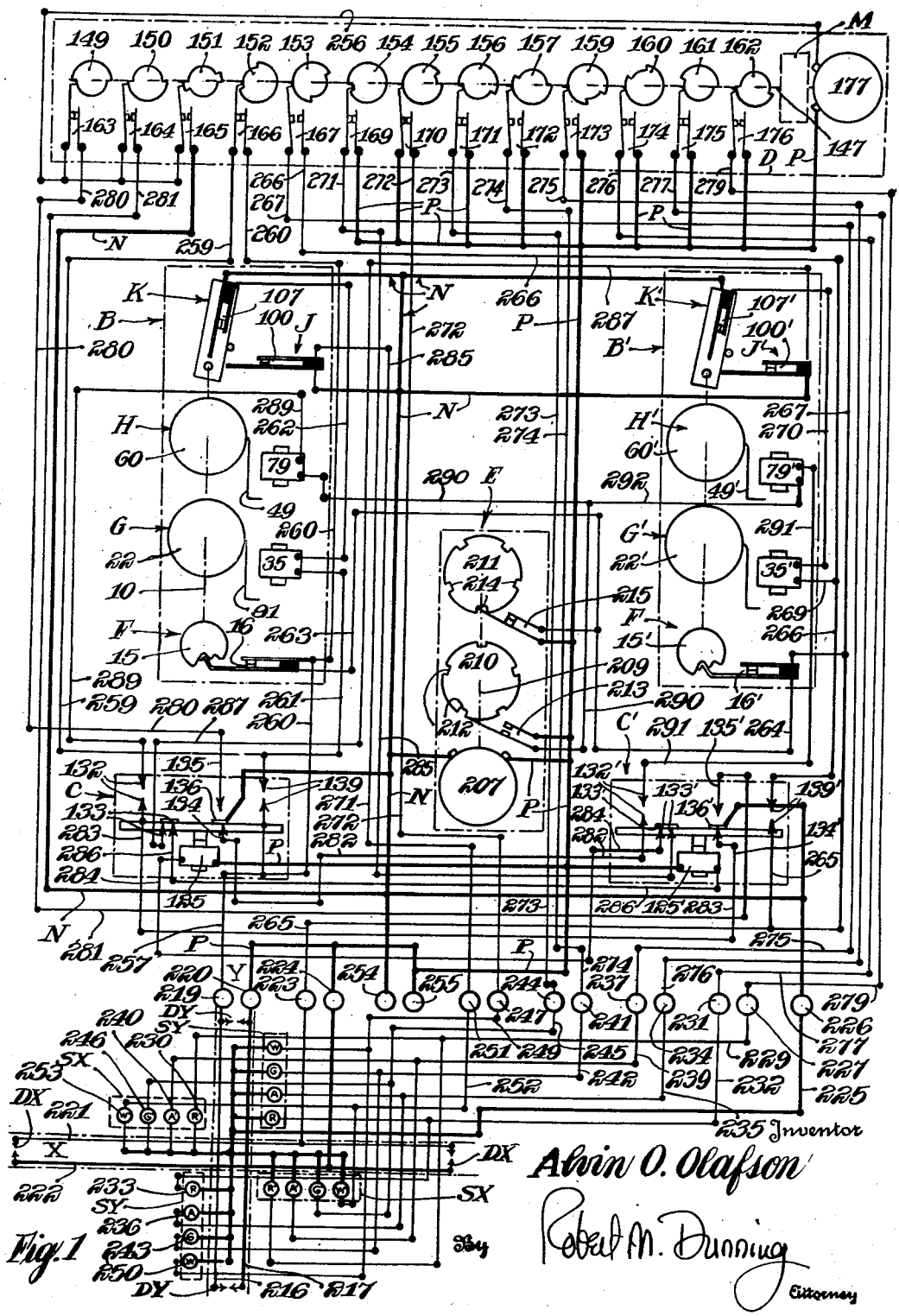
Figure 1 is a wiring diagram of my controller showing the construction thereof.

The essential units combining together to form my controller are as follows:

1. A timing unit for each highway. These units are identical and are illustrated in Figure 1 by the letters B and B'.

2. A main switch unit for each highway. These units are identical and are illustrated in Figure 1 at C and C'.

3. A cam unit D for operating the signals and regulating the circuits.

4. An impulse unit E for producing electrical impulses at regularly spaced intervals.

The controller is used in conjunction with traffic signals preferably having red, amber, green and walk lights; and with traffic actuated detectors which are actuated by vehicles approaching the intersection. These detectors may be of any desired type which may result in the provision of an electrical impulse to the controller. The contact pad type will provide two impulses for each vehicle, unless special means are used to prevent the second impulse. If each vehicle provides two impulses, provisions may be made to compensate therefor. The magnetic field type of detector or the electric eye type provides but one contact per vehicle, but requires relays or other additional means not illustrated for the purpose of simplicity.

The timing units

The timing unit B is shown in Figures 2 through 5 of the drawings. Each timing includes the following parts:

1. A manually controlled switch unit F.

2. An electrically actuated prolonging ratchet unit G which determines the extent to which the "Go" signal is prolonged. Each ratch actuation, up to a predetermined maximum, prolongs the "Go" signal on a corresponding highway. The ratchet may be electrically actuated either by a vehicle approaching the intersection or by the impulse unit.

3. A second electrically actuated resetting ratchet H which is actuated by the impulse unit and acts to return or reset the prolonging ratchet to starting position.

4. A fixed limiting switch J which is open when the prolonging ratchet is in starting or inoperative position and closed when the prolonging ratchet is out of starting position.

5. A normally closed limiting switch K which is adjustable about the ratchet shaft and which is opened when the prolonging ratchet has traveled through a predetermined angular distance.

6. A stop L which regulates the predetermined initial period through which the "Go" signal must be displayed on a given highway before this "Go" signal may be relinquished.

The manually controlled switch F is not necessarily a part of the timing unit B, but is formed as a part thereof for the purpose of convenience. A shaft 10 is supported through bearing sleeves, which will be later described, by the front panel 11 of the cabinet A. Near its other end the shaft 10 is supported by a bearing support 12 secured to the base 13 of the cabinet A. Forwardly of the front panel 11 of the cabinet, the shaft 10 is provided with a knob 14 by means of which the shaft may be rotated. At its other end a cam 15 is provided which serves as a means of operating a pair of contact blades 16 forming a switch.

Figure 4:
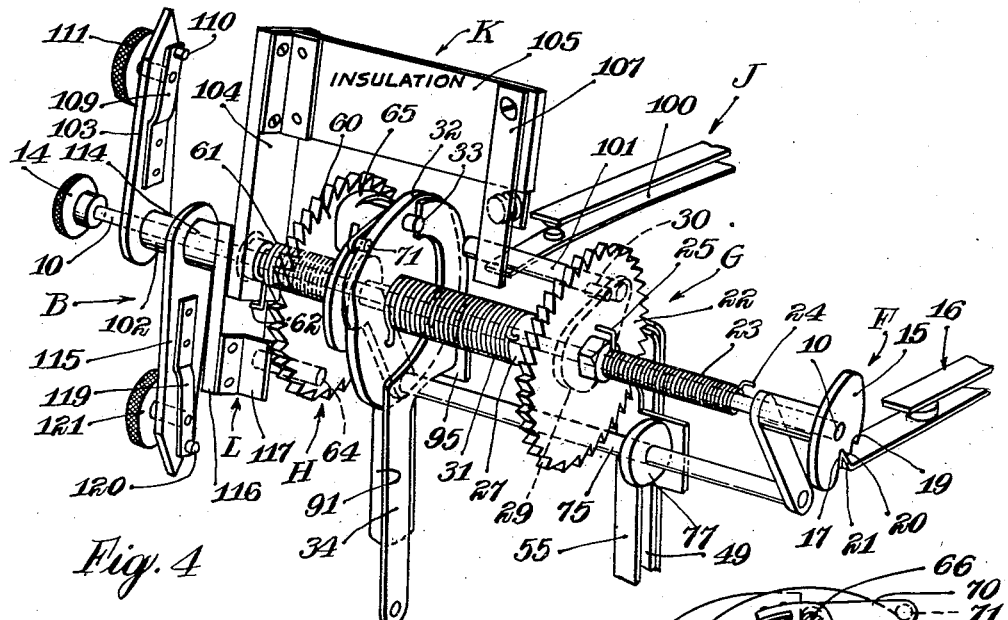
Figure 4 is a diagrammatic perspective view showing the arrangement of parts forming the timer unit.
Figure 9:
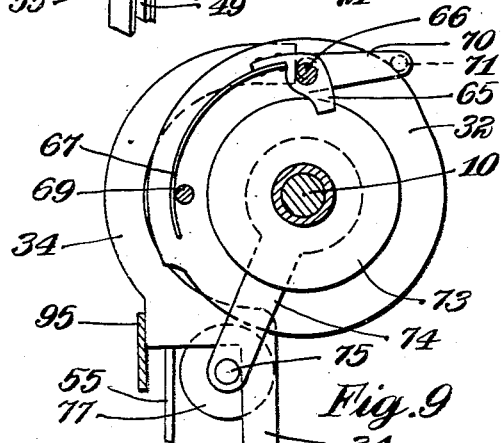
Figure 9 is a view similar to Figure 8 showing another position of the elements.

As best indicated in Figure 4 of the drawings, the cam 15 is provided with a pair of notches 17 and 19 which are spaced by a relatively raised portion 20. The V-shaped end 21 of one of the contact blades 16 is selectively engageable in either of the notches 17 and 19. When the cam 15 is in the position shown in Figure 4 of the drawings, the blades 16 are allowed to come together to form contact therebetween. When the shaft 10 is rotated so that the switch blade end 21 is in engagement with the notch 19, the switch blades will be separated to break contact therebetween. As will be later described in detail, when the switch blades 16 are in contact the associated timer unit B is in automatic or semi-automatic operation. When the switch blades 16 are separated, the associated timing unit is set for vehicle actuation.

Figure 2:
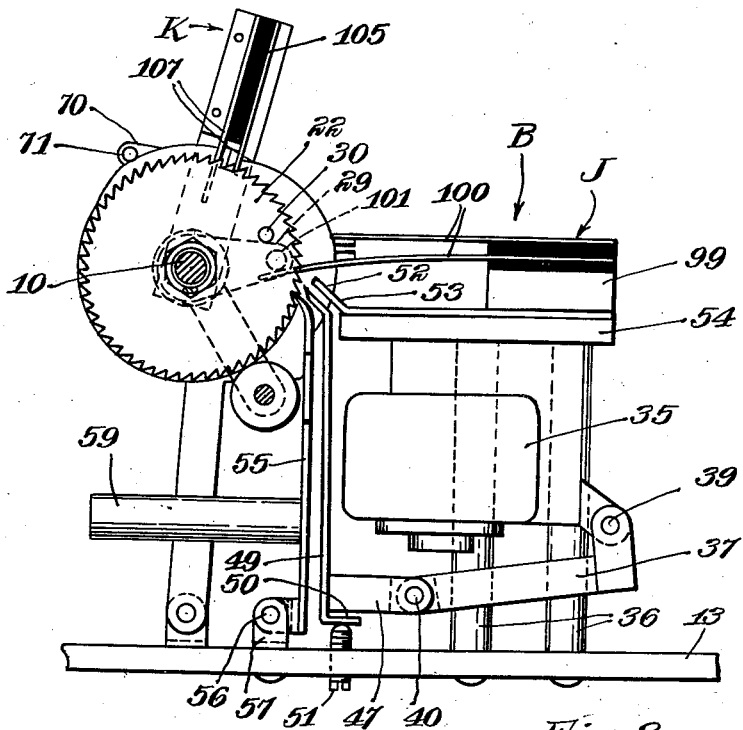
Figure 2 is a plan view of one of my timer units showing the construction thereof.
Figure 3:
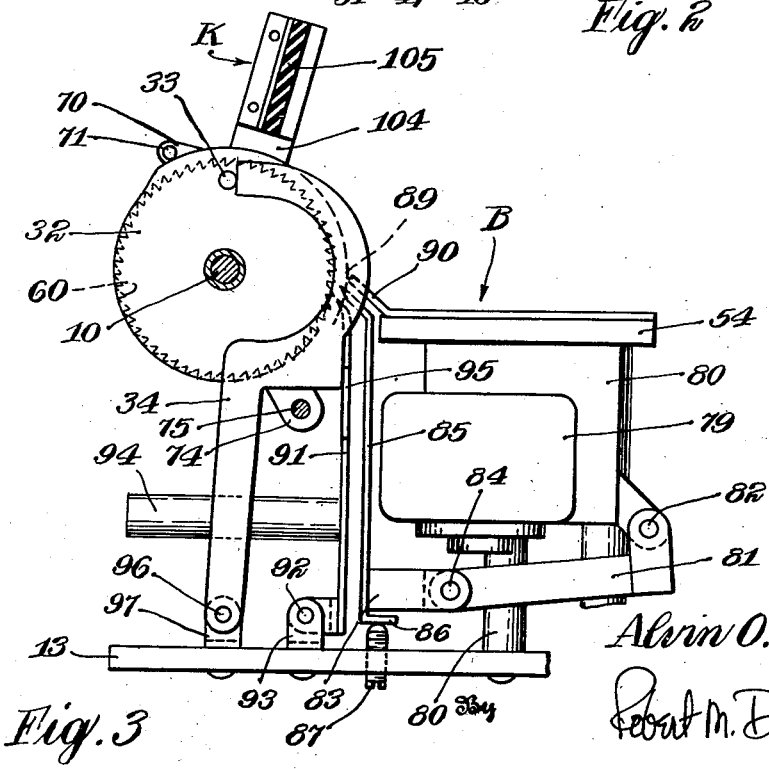
Figure 3 is a sectional view through the timer unit, the position of the section being indicated by the line 3—3 of Figure 5.
Figure 5:
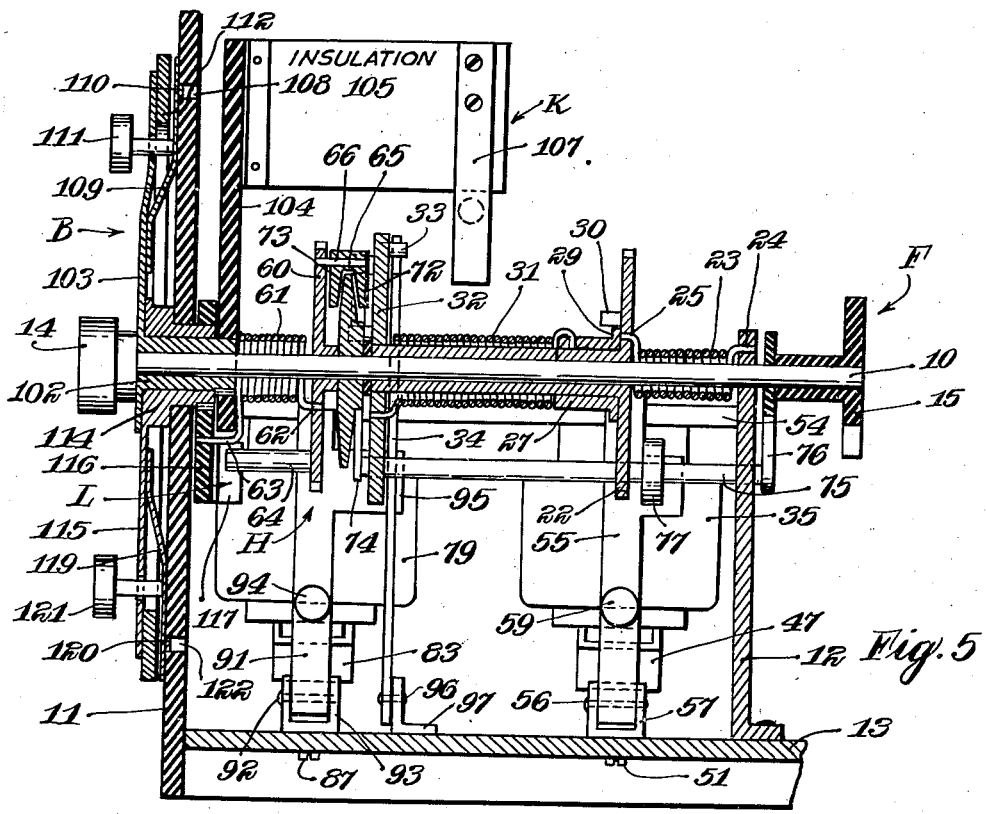
Figure 5 is a sectional view through the timer unit, showing the arrangement of the parts therein.

The electrically actuated prolonging unit G includes a ratchet gear 22 rotatable upon the shaft 10 and urged by a spring 23 in a clockwise direction as viewed in Figures 2 to 4 of the drawings. The spring 23 is connected at one end 24 to the bearing support 12 as indicated in Figure 5 and is connected at its other end 25 to the ratchet gear 22. This spring 23 tends to return the ratchet to its initial or starting position.

A sleeve 27 is mounted upon the shaft 10 to rotate relative thereto. An arm 29 is rotatably supported on the sleeve 27 adjacent the ratchet 22. A pin 30 is provided on the ratchet against which the arm 27 is urged by means of a spring 31.

A cam 32 is secured to the sleeve 27 for rotation with this sleeve and with the ratchet wheel 22. This cam is provided with a pin 33 projecting from one side thereof to operate the ratchet resetting lever 34 which will be later described in detail.

The ratchet gear 22 is operated as best illustrated in Figure 2 of the drawings. A magnet 35 is supported by suitable supporting means 36 secured to the cabinet base 13. A weighted arm 37 is pivoted to the magnet support at 39. This weighted arm 37 is pivoted at 40 to a weighted link 47 rigidly connected to an upstanding pawl 49. The pawl 49 is provided with a flanged end 50 which extends laterally parallel to the base 13, and a set screw 51 extends through the base by means of which the height of the pawl in lowered position, may be regulated.

The inclined upper end 52 of the pawl 49 engages against an inclined guide 53 mounted upon the table 54 overlying the magnet supports 36 and supported thereby. Upon actuation of the magnet 35 the upper end 52 of the pawl 49 is guided toward the ratchet gear 22 as it raises, thus bringing the pawl into engagement with the ratchet gear and rotating this ratchet gear the distance of one tooth of the ratchet.

A dog 55 engages the ratchet gear 22 to hold the same from rotating in a clockwise direction as viewed in Figures 2 and 4. The dog 55 is pivoted at 56 to a bracket 57 on the cabinet base 13, and is biased toward the ratchet gear by means of a weight arm 59 or a suitable spring. The dog 55 may be released to permit the spring 23 to return the ratchet to starting position in a manner which will be later described in detail.

The electrically actuated resetting ratchet H includes a second ratchet unit. A ratchet gear 60 is freely rotatable upon the shaft 10 and is urged in a clockwise direction as viewed in Figures 3 and 4 of the drawings, by means of a spring 61, one end 62 of which is anchored to the ratchet gear 60, while the other end 63 is anchored to a relatively stationary arm. The arm to which the spring is anchored is angularly adjustable between certain limits, but at all times maintains the spring 61 at the same tension in starting position.

A pin 64 is provided upon the ratchet gear 60 to project laterally therefrom. This pin is engageable with the adjustable stop L which will be later described in detail.

A gripping device 65 is pivotally mounted upon a pivot 66 carried by the ratchet gear 60. This gripping device 65 is urged in a counter-clockwise direction as illustrated in Figure 4 and in a clockwise direction as viewed in Figures 6 through 9 of the drawings, by means of a spring 67 anchored at 69 to the ratchet gear 60. An arm 70 extends forwardly from the gripping device 65 and is provided with a cam pin or roller 71 engageable with the peripheral surface of the cam 32. In other words, the spring 67 holds the pin 71 in engagement with the surface of the cam.

The gripping device 65 is provided with a wedge-shaped slot 72 therein embracing the periphery of a clutch wheel 73. When the gripping device 65 is permitted to pivot in a clockwise direction in the manner indicated in Figure 8, this gripping device will frictionally engage the periphery of the clutch wheel 73 to rotate this clutch wheel together with the ratchet wheel 60. An arm 74 is secured to the clutch wheel 73 for rotation therewith. A shaft 75 is secured at one end to the arm 74 and is supported at its other end by means of an arm 76 rotatably supported by the shaft 10. Therefore when the pin 71 of the gripping device 65 comes in contact with a reduced diameter portion of the cam 32, the clutch wheel 73 together with the arms 74 and 76, and the shaft 75 supported therebetween rotates in a clockwise direction as viewed in Figures 6 through 9, or in a counter-clockwise direction as viewed in Figures 2, 3, and 4.

Figure 6:
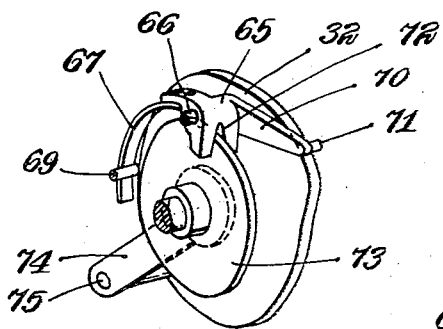
Figure 6 is a perspective view of a portion of the timer unit showing the construction thereof.
Figure 8:
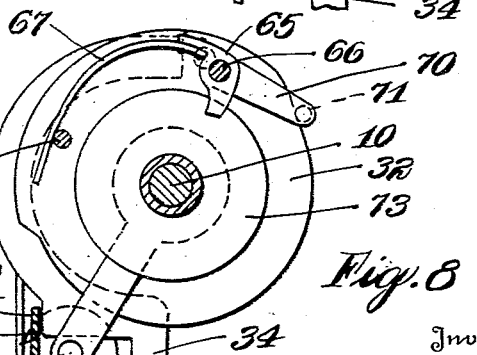
Figure 8 is a view similar to Figure 7 showing a slightly different arrangement of the elements.
Figure 7:
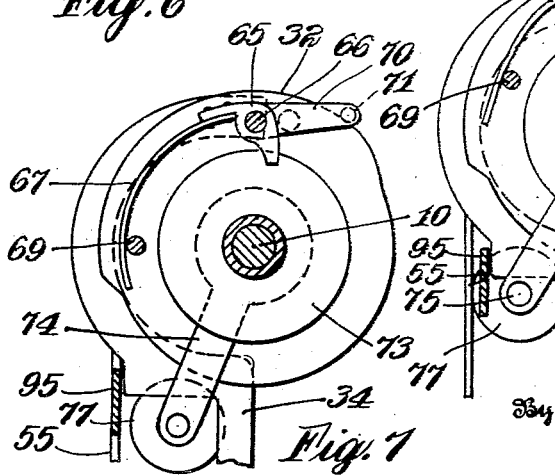
Figure 7 is a sectional view through a portion of the timer unit, the position of the section being indicated by the line 7—7 of Figure 5.

Figure 6 of the drawings shows the pin 71 engaging a large diameter surface of the cam 32, and the gripping device 65 disengaged from the clutch wheel 73. Figure 7 shows the gripping device in a slightly advanced position near the small diameter portion of the cam. Figure 8 shows the pin 71 in engagement with the small diameter portion of the cam, the clutch wheel engaged by this gripping device 65, and the clutch wheel 73 rotated to move the shaft 75 about the axis of the shaft 10. The shaft 75 supports a roller 77 which engages the dog 55 of the ratchet wheel 22. In Figure 8 of the drawings the roller 77 has disengaged the dog 55 from the ratchet 22, allowing the spring 23 to return this ratchet to its starting position.

The ratchet wheel 60 is operated by a magnet 79, best illustrated in Figure 3 of the drawings. The magnet 79 is supported by supporting structure 80 which assists in supporting the table 54. A weighted arm 81 is pivoted at 82 to the supporting structure 80. A weighted link 83 is pivoted to the arm 81 at 84. A pawl 85 is connected to the link 83 and includes a lower flanged end 86 substantially parallel to the cabinet base 13. A set screw 87 extends through the base 13 to regulate the lowered position of the pawl 85.

The upper end 89 of the pawl 85 is inclined toward the ratchet wheel 60 and is guided by the inclined guide 90 toward this ratchet wheel. Upon energization of the magnet 79, the pawl 85 will be lifted forwardly and toward the ratchet wheel to advance this wheel the distance of one tooth.

A dog 91 is pivoted at 92 to a bracket 93 supported upon the base 13, and is urged toward the ratchet wheel 60 by means of a weight arm 94. A lateral projection 95 is provided upon the dog 91 for engagement with the disengagement lever 34 pivoted at 96 to a bracket 97 on the base 13. As indicated in Figures 3 and 4 of the drawings the lever 34 is engaged by the pin 33 on the cam 32 to disengage the dog 91 from the ratchet 60.

The normally closed switch J is illustrated in Figures 2 and 4 of the drawings. This switch J is supported by insulating means 99 upon the table 54 and includes contact blades 100 which are normally held spaced by means of a stub shaft 101 mounted upon the arm 29 previously described. This stub shaft 101 is shown in Figures 2 and 4 engaging the lower blade of the contact blades 100 to hold these blades separated. The arm 29 supporting the stub shaft 101 is returned to the starting position illustrated by engagement with the pin 30 of the ratchet wheel 22, which is of course rotated to starting position by the spring 23.

The stub shaft 101 is also engageable with a normally closed limiting switch K which is angularly adjustable about the shaft 10. A sleeve 102 is supported by the shaft 10 adjacent the knob 14. An adjustment arm 103 is secured to the sleeve 102 at one end thereof to rotate with the sleeve. An arm 104 is secured to the other end of the sleeve 102 to rotate with the sleeve and the arm 103. An insulation block 105 is supported by the arm 104 to rotate angularly therewith. A pair of contact blades 107 are supported by the insulation block 105. One of the contact blades 107 extends in the path of the stub shaft 101. As a result when the ratchet wheel 22 rotates a predetermined angular distance, the stub shaft 101 engages the projecting blade of the switch blades 107, separating these blades and breaking the circuit therebetween. The ratchet wheel 22 and the cam 32 are free to continue rotation as the ratchet wheel is connected to the arm 29 through the spring 31. However, the movement of the arm 29 is arrested by the limiting contact blades 107. As will be later described the opening of the limiting switch 107 opens the circuit to the prolonging magnet 35.

A flat spring 109 is supported at one end by the pointer arm 103. A pin 110 is supported on the free end of the spring 109. A headed pin 111 extends through the arm 103 and is axially slidable with respect thereto. One end of the pin 111 is connected to the spring 109 so that when the pin is pulled outwardly the spring 109 will be flexed toward the pointer arm 103. The pin 110 is designed to engage in any of a series of radially spaced holes 112 in the cabinet panel 11. Thus the pointer arm 103 may be angularly adjusted by flexing the spring 109 away from the cabinet panel 11, swinging the pointer arm 103 in the proper direction, and releasing the pin 111 to permit the pin 110 to be engaged in another aperture 112.

As best illustrated in Figure 26 of the drawings, rings 112 are supported upon the cabinet panel 11 forwardly of each unit B or B'. The ring 112 is provided with a series of spaced indicating marks 113 thereupon. When the pointer arm 103 is directed toward the indications at the left hand end of this series of indications 113, the limiting switch K will be pivoted to provide a minimum prolonging period for the associated timing unit. By moving the pointer 103 in a clockwise direction, the limiting switch K may be moved to permit considerably more rotation of the ratchet wheel 22 before the circuit through the limiting switch blades 107 is broken.

The stop L is best illustrated in Figures 4 and 5 of the drawings. A sleeve 114 encircles the sleeve 102 and is concentric therewith. A pointer arm 115 is fixed to one end of the sleeve 114 while an arm 116 is secured to the other end of this sleeve 114. By rotating the pointer arm 115 about the axis of the shaft 10, the arm 116 may be moved in a counter-clockwise direction or in a clockwise direction.

A bracket 117 is provided on the arm 116 which is engageable with the pin 64 on the ratchet wheel 60. Movement of the ratchet wheel in one direction is limited by the position of the arm 116.

A flat spring 118 is supported at one end by the arm 115 and supports a pin 120 at its free end. An adjustment pin 121 extends through the arm 115 and slides axially of the pin being connected terminally to the spring 119 near its free end. The pin 120 is designed to engage in any of a series of angularly spaced apertures 122 in the cabinet panel 11. By pulling upon the pin 121, the pin 120 may be withdrawn from its aperture, allowing angular adjustment of the pointer arm 115 to set the stop 117 in proper position.

A series of indicating marks 123 are provided on the rings 112 to indicate desired settings for the pointer arms 115. When the arm 115 is pivoted in a clockwise direction as viewed in Figure 26, or a counter-clockwise direction as viewed in Figure 4, the stop 117 will advance the ratchet wheel 60 to cut down the initial period of display of the timer. By moving the pointer arm 115 in the opposite direction, the initial "Go" display period of the signal on the corresponding highway may be lengthened.

While the operation will be discussed more thoroughly in conjunction with the wiring diagram, the operation of the timing units B and B' will be briefly described as follows:

The controller is first set to provide a desired initial display period and the desired prolonging period for the associated highway. This adjustment places the resetting ratchet wheel 60 at a desired initial position and places the limiting switch K at the desired angular distance from the fixed limiting switch J.

An impulse either from vehicle detector pads, or from another source, as will be later described, energizes the magnet 35. This movement raises the pawl 49 rotating the ratchet wheel 22 and closes the contacts J. If additional impulses are subsequently received by the magnet 35 prior to the return of the ratchet wheel 22 to starting position, the ratchet wheel will be further advanced. Rotation of the ratchet wheel 22 acts through the spring 31 to rotate the arm 29 and the cam 32, thus advancing the cam to space the small diameter portion thereof farther from the starting point of the gripping device 25. If sufficient impulses are received by the magnet 35 to engage the stub shaft 101 with the limiting switch contacts 107, the angular movement of the arm 29 and the cam 32 is arrested, although the ratchet 22 may continue to advance until the circuit thereto is broken.

As soon as the fixed limiting switch J is closed a circuit is closed to provide intermittent impulses to the magnet 79. Accordingly at equal intervals the magnet 79 is energized, advancing the ratchet 60. When the ratchet 60 has advanced a distance sufficient to allow the cam pin 71 to engage a small diameter portion of the cam 32, the gripping device 65 will act as a clutch to connect the clutch wheel 73 to the ratchet wheel 60. Further rotation of the ratchet wheel will then advance the clutch wheel 73, acting to swing the roller 77 against the dog 55 to release the ratchet wheel 22. When released, the ratchet wheel 22 and the cam 32 connected thereto pivot into starting position, breaking the circuit through the fixed limiting switch J and again making contact in the adjustable limiting switch K, in the event these latter contacts have been broken. Return movement of the ratchet wheel 22 causes the pin 39 to engage the arm 29, moving the arm 29 and the stub shaft 101 connected thereto into starting position. As the cam 32 moves into starting position, the pin 33 mounted thereon engages the dog release lever 34, releasing the dog 91 of the ratchet wheel 60 and allowing the spring 61 to return the ratchet wheel 60 to starting position.

The units B and B' are identical, and in Figure 1, similar parts bear similar numbers. However, in order to distinguish between the units in the wiring diagram, a prime mark has been added to the reference numerals designating parts of the timer unit B'.

*Main switch units*

Figure 13:
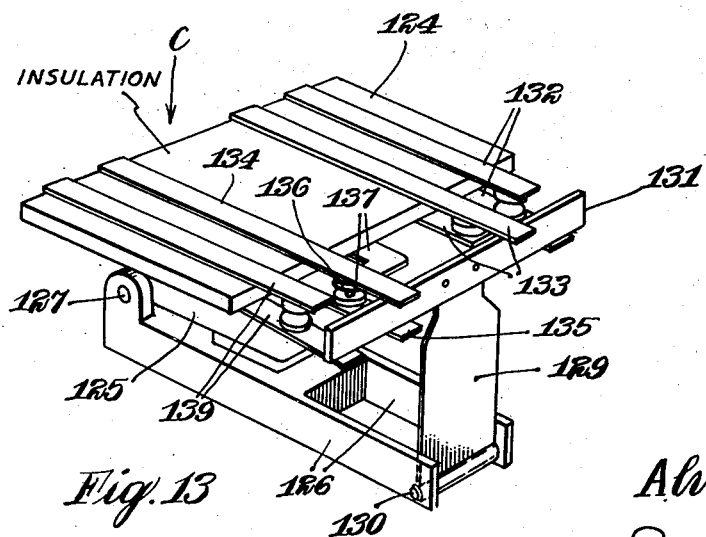
Figure 13 is a perspective view of one of the main switch units of my controller.

My traffic signal controller also includes two main switch units C and C' which are actuated by the timer units B and B'. The main switch units are illustrated in Figure 1 of the drawings and also in Figure 13 thereof. The units each include a bank of four switches, or in reality five separate switches, as one of the switches is a double contact switch.

The construction of the units may be considerably varied, as many types of switches of this nature are in production. In general, however, the units C include a platform 124 of insulation from which is supported a magnet 125. A pair of arms 126 connected as a unit are pivotally connected at 127 to the magnet supports. A link 129 is pivotally connected at 130 between the arms 126, this link acting to support a transversely extending bar 131 of insulation. Means, not illustrated for the purpose of simplicity, is provided to hold the link 129 generally vertical.

A pair of contacts 132 are connected to opposite sides of the platform 124 and are electrically insulated thereby. The lower one of the contacts 132 extends beneath the bar 131 so that when the arms 126 are in their normal lowered position illustrated, contact is broken between the blades 132. When the magnet 125 is energized, the bar 131 is elevated, allowing the contacts 132 to spring into contacting relation.

A second pair of contacts 133 are also secured in opposed relation to the upper and lower surfaces of the platform 124. The upper contact blade 133 extends above the arm 131 in the path of movement thereof. The blades 133 are normally in contacting relation in lowered position of the arms 126. However, when the magnet 125 is actuated, the arm 131 is raised, acting to break contact between these blades 133.

A third set of contacts are provided on the platform 124. This third set of contacts includes an upper contact 134 extending above the bar 131, a lower contact 135 extending below the bar 131, and an intermediate fixed contact 136 supported by a contact arm 137. In the normal lowered position of the arms 126 the upper arm 134 is in engagement with the intermediate contact 136. When the magnet 125 is energized, the upper contact 134 is disengaged from the intermediate contact 136 and the lower contact blade 135 is engaged therewith. Thus the intermediate contact 136 is alternately connected with the blade 134 and the blade 135.

A fourth pair of contact blades 139 are supported on opposite sides of the platform 124. The lowermost contact blade 139 extends beneath the arm 131 so that the blades are separated in the normal lowered position of the bar 131. When the magnet 125 is energized and the bar 131 is lifted, the contact blades 139 spring into contacting relation to close the circuit therebetween.

The main switch units C and C' are identical in construction. However, in order to properly describe the wiring diagram, it is necessary to add a prime mark to the numbers identifying the contacts of unit C'. Therefore the normally open contacts of unit C' corresponding to the blades 132 are illustrated at 132'. Contacts corresponding to the normally closed contacts 133 are illustrated at 133'. The upper contact 134 of the unit C corresponds with the upper contact 134' of unit C'. The intermediate contact 136 corresponds to the intermediate contact 136'. Lower normally open contact 135 corresponds to the lower contact 135' of unit C'. The normally open contacts 139 of unit C correspond to normally open contacts 139' of unit C'. The magnet 125 of unit C is indicated by the numeral 125'.

The cam unit

Figure 10:
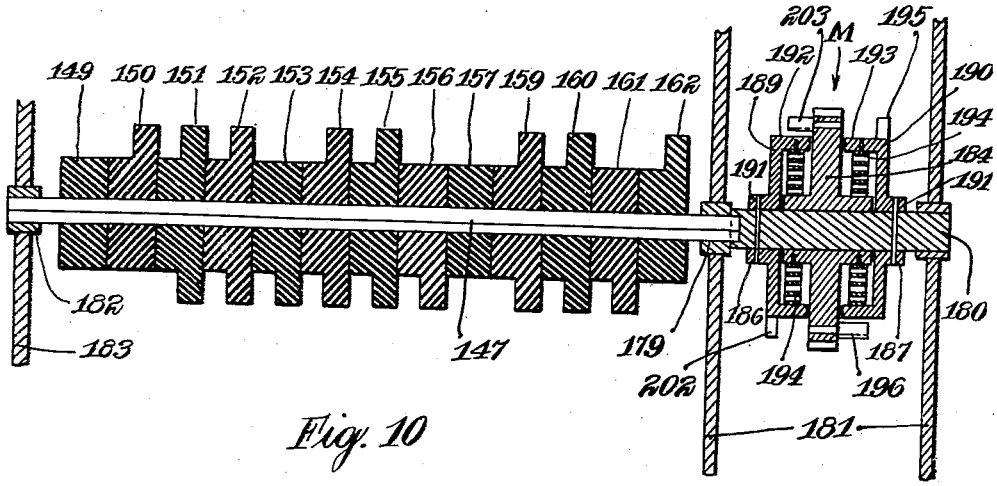
Figure 10 is a sectional view through a series of cams and a drive mechanism therefor.
Figure 11:
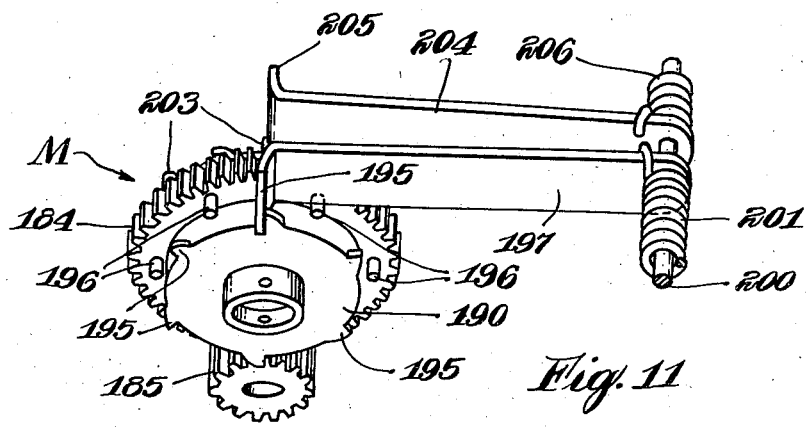
Figure 11 is a diagrammatic perspective view of the drive unit for the cams.
Figure 12:
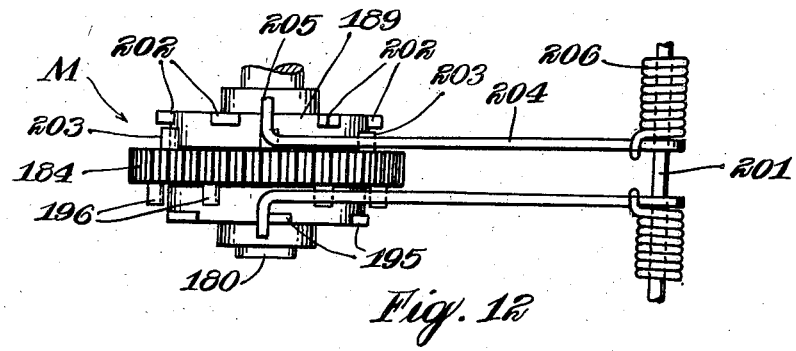
Figure 12 is a plan view of the cam drive unit shown in Figure 11.

The cam unit D is shown in Figures 10, 11, and 12 of the drawings and relative positions of the cams of the cam unit during a cycle of operation are shown in Figures 14 through 25 of the drawings. The cam unit D includes in general a series of 13 cams mounted for rotation in unison with a common shaft 147. These cams are designated by the numerals 149, 150, 151, 152, 153, 154, 155, 156, 157, 159, 160, 161, and 162. These cams control switches which are numbered respectively, 163, 164, 165, 166, 167, 169, 170, 171, 172, 173, 174, 175, and 176. The effect each cam and its corresponding switch has upon the signal and control circuits will be later described in detail.

Also included in the cam unit D, I provide a driving motor 177 and an intermittent motion driving device M connecting the motor with the cams. The purpose of the intermittent motion device M is to rotate the cam shaft 147 in intermittent steps to move the switches from one portion of each cam to the next, quickly rather than gradually. Such action will not only increase the life of the contacts in the switches, but also will insure the simultaneous operation of various circuits.

The intermittent motion device M is best illustrated in Figures 10, 11 and 12 of the drawings. The shaft 147 is secured in a socket 179 of a shaft section 180 supported by flat supporting plates or frame walls 181. The shaft 180 and the shaft 147 connected thereto are free to rotate in the frame walls 181 and the shaft 147 is provided extra support by the bearing 182 in a third parallel frame wall 183 forming a part of the cabinet A. A gear 184 is freely supported on the shaft 180 and is driven by a pinion 185 in mesh therewith. The pinion 185 is connected to the motor 177 either directly or through a suitable gear reduction (not illustrated). The gear 184 is provided with hubs 186 and 187 on either side thereof. Ratchet wheels 189 and 190 are secured to the shaft 180 by pins 191 or other suitable means. Flanges 192 and 193 extend inwardly from the periphery of the ratchets 189 and 190 toward the gear 184 which is located therebetween. One or more spiral springs 194 are connected at their inner extremity to the hubs 186 and 187, and at their outer extremity to one or more of the flanges 192 and 193, so as to provide a resilient connection between the ratchet wheels 189 and 190 fixed to the shaft 180 and the gear 184 which is driven at a constant speed during the signal changing operation.

A series of six angularly spaced ratchet teeth 195 project outwardly from the periphery of the ratchet wheel 190. A series of pins 196 project laterally from the gear 184 to overlie a portion of the flange 193 of the ratchet wheel 190. The teeth 195 are successively engaged by a pawl 197 having a transversely extending hook end 199. The pawl 197 is pivoted on a shaft 200 substantially parallel to the ratchet shaft and is held against the ratchet wheel. The pawl 197 is in the path of movement of the pins 196 and the hook end 199 thereof engages the ratchet teeth 195.

The ratchet 189 is similarly constructed. A series of six angularly spaced ratchet teeth 202 are provided about the periphery of the ratchet wheel 189 and laterally extending pins 203 are provided on the gear 184 to overlie a portion of the flange 192. The pawl 204 is pivoted on the shaft 201 and overlies the pins 203 and is in the path thereof. A hook end 205 on the pawl 204 successively engages the ratchet teeth 202. A spring 206 normally holds the ratchet 204 against its ratchet wheel.

In operation the motor 177 drives the pinion 185 which in turn rotates the gear 184 at a constant speed. From the position illustrated in Figures 11 and 12 of the drawings, rotation of the gear 184 causes one of the pins 196 to engage beneath the pawl 197 gradually raising the same against tension of the spring 201 until the hook end 199 of the pawl is disengaged from the ratchet tooth 195 previously engaged thereby. As soon as the ratchet wheel 190 is disengaged, the ratchet is rotated by the internal spring or springs 194 until a ratchet tooth 202 of the ratchet 189 engages the hook end 205 of the pawl 204. The pawls 197 and 204 intermittently engage because of the alternate position of the pins 196 and 203 on the gear 184 and the alternate location of the ratchet teeth on the two ratchet wheels.

When the ratchet 189 is in engagement with the pawl 204, continued rotation of the gear 184 brings a pin 203 under the pawl acting to raise the same out of engagement with the ratchet tooth 202, allowing the spring or springs 194 to again rotate the ratchet wheels one-twelfth of a rotation. As previously stated, the ratchet teeth of each ratchet wheel are located sixty degrees apart, but the teeth of one ratchet are mid-way between the teeth of the other. As a result the shaft 147 and the cams thereupon are rotated in steps, the intermittent motion mechanism M acting to swing the cams through an angular distance of thirty degrees at a time during its operation.

The impulse producing unit

In order to reset the timer unit and also to provide a means of operating my controller to provide automatic operation thereof, I provide an impulse producing element E. This element E includes a motor 207 which operates continuously when the controller is in use. This motor 207 actuates a drive shaft 209 illustrated diagrammatically in Figure 1, which rotates a pair of timer discs 210 and 211 in unison therewith. The disc 210 is provided with a series of spaced peripheral notches 212 therein into which may engage one blade of a pair of contact blades 213. At intervals during the rotation of the disc 210, one blade drops into a notch 212 closing the contacts 213 and thus closing a circuit between these contact blades.

The disc 211 is similarly constructed with peripheral notches 214 into which one blade of the normally open contacts 215 may engage. As a result at spaced intervals the contacts 215 are closed to produce an electrical impulse therethrough when the associated circuit is complete.

The wiring diagram

Having now described the detail construction of the various parts of my controller, I now desire to describe the operating circuit therefor. The controller is designed for use for controlling signals at an intersection of two highways, which I have designated as X and Y in Figure 1 of the drawings. The highway X is provided with vehicle actuated detector means which may be designated DX, while the highway Y is provided with vehicle actuated detectors which may be designated DY. For the purpose of simplicity the signal units used on highway X have been designated generally as SX, while the corresponding signals on the highway Y have been generally designated SY.

In the system illustrated, I provide two conductors 216 and 217 leading from the vehicle actuated detectors DY to terminals 219 and 220, respectively, on the controller. Two conductors 221 and 222 likewise lead from the vehicle detectors DX to terminals 223 and 224 of any controller. There are preferably nine conductors leading from the controller to the various signals. The conductor 225 leads from the control terminal 226 to all of the signal lights, this conductor forming one side of the circuit to each signal light. The terminal 227 is connected by conductor 229 to the red signal lights 230 of the signals SX. The terminal 231 is connected by the conductor 232 to the red signal lights 233 of signals SY. The terminal 234 is connected by the conductor 235 to the amber change lights 236 of the signal SY. The terminal 237 is connected by the conductor 239 to the amber lights 240 of the signal SX.

The control terminal 241 is connected by the conductor 242 to the green signals 243 of the signals SY. The terminal 244 is connected by the conductor 245 to the green signals 246 of the signals SX. The terminal 247 is connected by the conductor 249 to the "Walk" or "Advance" signals 250 of the signals SY. The terminal 251 is connected by the conductor 252 to the "Walk" or "Advance" signals 253 of the signal SX.

The terminals 254 and 255 are connected to a source of power supply, through a master switch (not illustrated). Conductors N and P are connected to these terminals, respectively. The letters N and P are chosen arbitrarily as a simple means of distinguishing between the main power supply lines, rather than as an indication of polarity. For convenience, the conductors N and P are shown in heavy lines extending to all elements to which they are permanently connected.

The conductor N extends directly to one blade of the cam switch 165, and to intermediate main switch terminals 136 and 136', which are alternately connected to contacts 134 or 134', and to 135 or 135' respectively. Conductor N is also connected to one terminal of the motor 207 of the impulse producing unit E. This conductor is likewise permanently connected to one contact 100 and 100' of the fixed limiting switches J and J'. Conductor N is also connected to one contact 107 and 107' of the adjustable limiting switch L. This conductor is also connected to the terminal 226 connected to the common wire 225 of all of the signal lights SX and SY.

The conductor P is connected to terminals 220 and 224 leading to vehicle detectors DY and DX. Obviously, when certain types of detectors are used, relays must be provided in the circuit to produce an impulse of necessary amplitude. However, for the sake of simplicity, contact type detector pads are indicated.

Conductor P is connected to one terminal of each of the magnets 125 and 125'. This conductor is also connected to the remaining terminal of the motor 207 driving the impulse producing unit. Conductor P is likewise connected to one impulse contact switch 213 and an impulse contact switch 215. This conductor is also connected to one blade of each of the cam switches 169, 170, 171, 172, 173, 174, 175, and 176. Conductor P is also connected to one terminal of the cam motor 177. The other contact of the cam motor 177 is connected by the conductor 256 to one terminal of the cam switches 163 and 164, and to the remaining terminal of the cam switch 165.

Terminal 219 (leading to the detectors DY) is connected by the conductor 257 to one normally broken contact 139 of the main switch unit C. The remaining contact 139 is connected by the conductor 259 to one blade of the cam switch 166. The other blade of the cam switch 166 is connected by the conductor 260 to one blade 16 of the manually operated switch F. The conductor 260 also is connected to the conductor 257.

The above mentioned remaining contact 139 is also connected by the conductor 261 to one terminal of the time prolonging magnet 35. The other terminal of the magnet 35 is connected by the conductor 262 to the remaining terminal 107 of the adjustable limiting switch L.

The remaining contact 16 of the manually controlled switch F is connected by the conductor 263 to the remaining blade of the impulse switch 215. The conductor 264 connects the conductor 263 with one blade 16' of the manually controlled switch F'.

The terminal 223 (connected to the vehicle detector DX) is connected by the conductor 265 to one normally open contact 139' of the main switch unit C'. The remaining contact 139' is connected by the conductor 266 to one blade of the cam switch 167. The other blade of the cam switch 167 is connected by the conductor 267 to one blade 16' of the manually operated switch F'. The conductor 267 also is connected to the conductor 265.

The above mentioned remaining contact 139' is also connected by the conductor 269 to one terminal of the time prolonging magnet 35'. The other terminal of the magnet 35' is connected by the conductor 270 to the remaining terminal 107' of the adjustable limiting switch L. The remaining contact blade 16' of the switch F is connected by the conductor 264 to the impulse switch 215, as previously stated.

The terminal 251 is connected by the conductor 271 to the remaining terminal of the cam switch 169. Thus the cam switch 154 controls the circuit to the "Walk" signals on highway X. The terminal 247 is connected by the conductor 272 to the remaining terminal of the cam switch. Thus the cam 155 and its switch 170 control the circuit to the "Walk" signals on highway Y.

The terminal 244 is connected by the conductor 273 to the remaining terminal of the cam switch 171, and this cam switch controls the circuit to the "Go" signal on highway X. The terminal 241 is connected by the conductor 274 to the remaining terminal of the switch 172; and this switch accordingly regulates the circuit to the "Go" signal on highway Y.

The terminal 237 is connected by the conductor 275 to the remaining terminal of the cam switch 173. Thus it will be seen that the cam switch 173 and the cam 159 actuating the same control the circuit to the amber signals on highway X. The terminal 234 is connected by the conductor 276 to the remaining terminal of the cam switch 174. Thus the cam switch 174 and the cam 160 controlling the same actuate the amber signals on highway Y.

The terminal 231 is connected by the conductor 277 to the remaining terminal of the cam switch 175; and this switch and the cam 161 actuating the same control the red signals 233 on highway Y. The terminal 227 is connected by the conductor 279 to the cam switch 176; and this switch and the cam 162 actuating the same, control the red signals 230 of highway X.

The connections to all of the cam switches have been described with the exception of those to switches 163 and 164. One terminal of each of these switches is connected to the cam motor 177. The other terminal of the switch 163 is connected by the conductor 280 to the main switch contact 135 of the main switch C. This contact is normally broken but upon energization of the magnet 125 a contact will be made through the conductor 280 from the line wire N to the switch 163.

The cam 164 has its remaining terminal connected by the conductor 281 to the contact 135' of the main switch C'. This contact is normally broken but upon energization of the magnet 125 a circuit will be closed from the line wire N to the switch 165.

I have now described all of the circuits directly connected to the controller terminals and involving the various cam switches of the cam unit D. I will next describe the connections through the main switches C and C'.

The circuit through the normally open contacts 139 has been previously described. The contact 134 is connected by the conductor 282 to one of the normally open contacts 132' of the unit C'. Similarly the contact 134' is originally connected by conductor 283 to the contact 132 of the unit C.

The switch units C and C' are actuated by magnets 125 and 125', one terminal of which is connected to the line wire P. The other terminal of the magnet 125 is connected by the conductor 284 to one of the normally closed contacts 133. The remaining contact 133' is connected by the conductor 285 to the remaining contact 100 of the fixed limiting switch J.

The remaining terminal of the magnet 125' is connected by the conductor 286 to one of the normally closed contacts 133 of the main switch unit C. The remaining contact 133 is connected by the conductor 287 to the remaining terminal 100' of the fixed limiting switch J'.

The remaining contact 132 is connected by the conductor 289 to one terminal of the magnet 79 for operating and resetting the ratchet wheel 60. The other terminal of the magnet 79 is connected by the conductor 290 to the remaining terminal of the impulse producing switch 213. The remaining contact 132' of the switch unit C' is connected by the conductor 291 to one terminal of the magnet 79, actuating the resetting ratchet wheel H'. The other terminal of the magnet 79' is connected by the conductor 292 to the conductor 290 leading to the impulse producing switch 213.

*Operation of the controller*

In the operation of my controller, the main switch is closed directing current to the terminals 254 and 255 connected to the line wires N and P, respectively. The motor 207 being connected directly to both line wires immediately starts into motion, rotating the discs 210 and 211. Rotation of these discs initiates regularly timed impulses when the accompanying circuits are closed.

If the controller is to be actuated by traffic approaching the intersection of highways X and Y, the manually controlled switches F and F' are both turned into position to separate the contacts 16 and 16', or in other words to open these switches. In the position disclosed, the cams are in the position shown in Figure 1 of the drawings. In this position the cam 149 is in position to close the switch 163, but the switches 164 and 165 are opened. No circuit is closed to the motor 177, however, as the conductor 280 leading to the closed cam motor switch 163 is spaced from the intermediate terminal 136 of the switch C. The cam switch 166 is closed and accordingly the detectors DY are live. The cam switch 167 is open and therefore the circuit to the magnet 35' is broken from the vehicle detectors DX. The cam switch 169 is closed, therefore illuminating the walk signals 253 on highway X. The cam switch 170 is broken, thereby braking the circuit to the "Walk" signals 250 on highway F. The cam switch 171 is closed, thereby closing a circuit to the green signals 246 on highway Y. Contacts 172 are broken, thereby opening the circuit to the green signal on highway X. The contacts 173 are open and thereby the amber change lights 240 of highway Y are not illuminated. The contacts 174 are also open and therefore the amber signals 236 on highway X are likewise not illuminated. The contacts 175 are closed, thus closing a circuit to the red signal lights 233 of highway X. The contacts 176 are open and as a result the red signal lights 230 on highway Y are not illuminated.

When the signal cams are in the position shown in Figure 4, as described, it will be noted that the right-of-way is being given to traffic on highway X and that the red signal is being displayed on highway Y. However, should a vehicle approach the intersection on highway Y, the detectors DY would be energized, thus closing a circuit from the conductor 217 connected through the terminal 220 to the line wire P to conductor 216 connected through the terminal 219 to the conductor 257. This circuit passes through the conductor 260, through the closed cam switch 166, through the conductor 259 to the magnet 35. The other terminal of this magnet 35 is connected through the conductor 262 and the limiting switch L to the other line wire N, thus completing a circuit to the magnet 35 to energize this magnet. This action operates the pawl 55 to rotate the ratchet wheel 22 in a counter-clockwise direction as viewed in Figure 2 and 4 of the drawings, and disengages the stub shaft 101 from the fixed limiting contact switch J closing a circuit through the contacts 100.

This action closes a circuit from the line wire N through the contacts 100 through conductor 285, through the normally closed contacts 133', through the conductor 284 to one terminal of the main switch unit magnet 125, the other terminal of which is connected to the line wire P. Energization of the magnet 125 acts to shift the main switch C, closing contacts 132 and 139, breaking contacts 133, and connecting contact 135 to the intermediate contact 136 which is connected to the line wire N.

The actuation of the main switch unit C closes a circuit from the line wire N through the contacts 136 and 135 through the conductor 280 to the closed cam switch 163, and through the conductor 256 to the cam motor 177, the other terminal of which is connected to the line wire P. As a result a circuit is closed to the motor 177 which rotates all of the cams connected thereto through 180°. The operation of the motor 177 through 180° is insured by the cam switch 165 which is open only at two points spaced 180° apart. Therefore as soon as the motor 177 starts into operation and the cams are shifted thirty degrees, the cam switch 165 is closed, closing a direct circuit from the power line N through contacts 165 and conductor 256 to the motor 177, the other terminal of which is connected to the line wire P. Actuation of the main switch unit C also closes a circuit from the line wire N through the contact 136' and terminal 134' through the conductor 283 and contacts 132 and conductor 289 to the magnet 79. The terminal of the magnet 79 is connected through the conductor 290 to the impulse switch 213, the other terminal of which is connected to the line wire P. As a result a circuit is closed at regularly timed intervals to the magnet 79, tending to advance the ratchet wheel 60 until the gripping element 65 engages the clutch wheel 73 and swings the roller 77 against the dog 55 to release the ratchet wheel 22. When the dog 55 has been released from the ratchet wheel, this wheel will be returned by its spring 23 to normal starting position, breaking the contacts 100 in fixed limiting switch J, and thereby opening the circuit through the contacts 133' to the switch unit solenoid 25. This switch unit 25 will then return to normal position. The resetting of the ratchet wheel 22 swings the cam 32 in a clockwise direction, as viewed in Figure 4, acting through the lever 34 to release the dog 91, thereby permitting the spring 61 to return the ratchet wheel 60 to its starting position with the pin 64 engaged against the adjustable stop 117.

During the rotation of the cams from the position shown in Figure 14 to the position shown in Figure 20, the following changes take place. The cam 149 maintains its cam switch 163 closed until it reaches the position shown in Figure 20, at which time operation of the motor 177 ceases. The cam 150 maintains its contacts 164 open throughout the rotary movement thereof until the position illustrated in Figure 20 is reached, whereupon the contacts 164 are closed. The motor cam 151 holds its contacts 165 open until the cams have been rotated through a distance of thirty degrees, whereupon the contacts 165 are closed and remain closed until the cams reach the position shown in Figure 20, whereupon the circuit to the motor is broken.

The cam 152 controlling the contacts 166 through which one of the impulses resulting in the operation of the cam motor was transmitted, acts to open these contacts 166 as soon as the cams have rotated thirty degrees. Traffic on the highway Y may still actuate the prolonging ratchet wheel 22 because of the closing of the main switch contacts 139. In other words, the switch 166 and the switch contacts 139 are in parallel and an impulse may be directed to the magnet 35 either through the cam switch 166 or the main switch contacts 139.

The cam 153 maintains its contacts 167 open, thus rendering the vehicle detectors on highway X inoperative or dead until the cams have traveled through a distance of ninety degrees. The reason for this lies in the fact that any vehicle crossing the detectors SX before the cams 153 reach the position in Figure 17, will have the necessary time to pass the intersection before the "Go" signal on highway X has been removed. However, any vehicle crossing the detectors SX after the cams have reached the position in Figure 17 is free to actuate the prolonging magnet 35' to insure the return of the "Go" signal to highway X at the termination of its proper period on highway Y. In other words, the closing of contacts 167 provides a memory period for vehicles which pass the detector pads on highway X too late to cross the intersection before the "Go" sign is relinquished.

The cam 154 holds its associated switch 169 closed only when the cam is in the position shown in Figure 14. In other words, as long as the cams remain in stationary position as shown in Figure 14, the contacts 169 are closed, providing a "Walk" signal for pedestrians on highway X. As soon as the cams start into operation the contacts 169 are broken, thereby de-energizing the "Walk" signal in advance of the relinquishment of the "Go" signal on highway X. In reality several of the positions of the cams could be eliminated, except for the "Walk" signal which must be obliterated sufficiently in advance of the changing of the signal to permit pedestrians who have started to cross the intersecting highway to complete this crossing.

The cam 155 maintains its associated switch 170 in open position until the cams reach the position shown in Figure 20. The cams then come to rest and the contacts 170 close to provide a "Walk" signal on highway Y.

The cam 156 controls the "Go" signal on highway X and maintains its switch 171 closed while the cam 156 rotates through 150° or into the position shown in Figure 19 of the drawings. Slightly in advance of the initiation of the "Go" signal on highway Y, the switch 171 opens the circuit to the "Go" signal on highway X to provide a short period during which the "Stop" signal may be displayed to both highways for the purpose of clearing traffic in the intersection.

The cam 157 controls the "Go" signal on highway Y, and the associated switch 172 remains open until the cams move into the position shown in Figure 20 of the drawings.

The cam 159 provides an amber light which is displayed during the last portion of display of the associated "Go" signal. The associated switch 173 remains open through ninety degrees of rotation of the cams, but the contacts close during the time the cams rotate sixty degrees during the last period of display of the "Go" signal on highway X. In other words, when the cams reach the position shown in Figure 17, the switch 173 is closed and remains closed in the position shown in Figure 18. In the position of Figure 19, however, the "Stop" signal is being displayed to both highways and the change signal switch 173 is again broken.

The cam 160 controls the circuit to the change light on highway Y. The associated switch 174 remains open throughout the movement of the cams from the positions shown in Figure 14 to the position shown in Figure 20. However, if an amber signal is desired on highway Y during the change of the signal to this street, the cam may be so arranged to close the circuit at the desired point.

The cam 161 maintains its associated contacts 175 closed from the position shown in Figure 14 to the position of Figure 20, to display a red signal on highway Y. When the position of Figure 20 is reached, however, the contacts 175 are broken to obliterate this "Stop" signal. The cam 162 maintains its associated switch 176 open until the cams reach the position shown in Figure 19. In this position, however, both of the circuits to the "Go" signals are broken and both of the circuits to the red signals are closed to display a "Stop" signal to both highways to clear traffic in the intersection.

In the event additional traffic approaches the intersection on highway Y, a circuit is closed from line wire P through terminal 220, conductor 217, detector DY, conductor 161, magnet 35, conductor 262 and adjustable limiting switch 107 to line wire N. Continuing traffic on highway Y can continue to advance the prolonging ratchet wheel 22 and the cam 32 connected therewith until the stub shaft 101 engages the limiting switch 107 to break the circuit thereto. The ratchet 22 is free to rotate slightly beyond this limiting position but as soon as the limiting switch 107 is broken all circuits to the prolonging magnet 35 are broken, as all circuits extend through this limiting switch. The detectors DY are then dead and further actuation will have no effect thereupon until the "Go" signal is either relinquished by highway Y, or is about to be relinquished.

I have now explained how the signal may be transferred from a "Go" display on highway X to a "Go" display on highway Y, and how the "Go" signal may be prolonged by continuing traffic. I have also explained how the period of display on the highway is limited by the adjustable limiting switch K which may be set to provide the maximum display period. After the ratchet wheel 22 and the cam connected thereto reach the limit of their movement as described the magnet 79 continues to be actuated at regular intervals by the impulse producing unit E until the gripping element 65 disclosed in Figures 6 through 9 acts as a clutch to swing the roller 77 against the dog 55 to release first the ratchet wheel 22 and immediately thereafter the ratchet wheel 60.

The return of the timing unit B to starting position acts to open contacts 100, thereby breaking the circuit which extends from the line wire N through the contacts 100, conductor 285, contacts 133', conductor 284, and magnet 125 which is connected to the line wire P. As a result the main switch unit C moves into its normal position illustrated in Figure 1. The "Go" signal however, continues to be displayed on highway Y in the advance of traffic approaching the intersection on highway X.

In the event traffic has actuated the detectors DX at a time too late to cross the intersection before the relinquishment of the "Go" signal on highway X, or in the further event that traffic actuates the detectors DX during the "Go" display on highway Y, circuits are closed to actuate the prolonging magnet 35' and to advance the associated ratchet wheel 22' and the cam 32' connected thereto. This circuit extends from the line wire P through the terminal 224, conductor 222, detector DX, conductor 221, terminal 223, conductor 265, conductor 267, contacts 167, conductor 266, magnet 35', conductor 270 and limiting switch 107' to the line wire N. Each such impulse actuates the magnet 35 and further advances the prolonging ratchet 22'. This action raises the associated stub shaft 101' out of engagement with the contacts 100', closing these contacts. As soon as the main switch C returns to the normal position shown, a circuit is closed from the line wire N through the contacts 100', conductor 287, contacts 133, conductor 286, and magnet 125', the other terminal of which is connected to line wire P. This energizes the main switch C', acting to close the contacts 132', and 139', to open contacts 133' and to connect the line wire N to the contact 135'.

As a result of this actuation of the main switch C', a circuit is closed from the line wire N through the contacts 136' and 135', conductor 281, closed contacts 164, conductor 256, and cam motor 177, the other terminal of which is connected to the line wire P. Energization of the motor 177 acts to move the cams from the position shown in Figure 20 of the drawings through the various positions shown in Figures 21 through 25 and into the position shown in Figure 14 of the drawings. The circuit to the motor 177 is maintained throughout 180° of rotation, by the cam 151 and its associated switch 165. During movement of the cams, it will be noted in Figure 21 that the "Walk" signals 250 on highway Y are de-energized in Figure 21. In the position shown in Figure 21, the circuit through the switch 167 is closed. The cam switches remain in their same relative positions in the position of Figure 22. However, in the position shown in Figure 23, the cam switch 166 is closed to permit cars approaching the intersection on highway Y to cause return of the signal to this highway after a proper display on highway X. It will also be noted in Figure 23 that the switch 174 is closed to display a change signal on highway Y.

In Figure 24 the cam switches remain in the same relative positions as shown in Figure 23. In Figure 25, however, the switch 171 is opened by its cam 156 to break the "Go" signal circuit to the signals SY. The switch 173 is also broken by its cam 159 to remove the change signal from highway Y. The switch 176 closes to provide a red signal on highway Y. As the red signal is also being displayed to highway X, a clearing period is provided for traffic in the intersection.

From the position shown in Figure 25, the cams move into the position shown in Figure 14, wherein "Walk" signal and "Go" signal are displayed on highway X, and the "Stop" signal is displayed on highway Y.

I have now described the manner in which the signals may be transferred from one highway to the other and I have also described the manner in which the "Go" display period may be prolonged on either highway. The prolonging period does not begin until the termination of the initial period which is regulated by the position of the adjustable stop 117. By rotating this stop 117 in a clockwise direction as illustrated in Figure 4, the ratchet wheel 60 and the gripping device 65 supported thereby may be rotated so that a longer time is required before the cam pin 71 may engage the reduced diameter portion of the cam 32.

If desired either highway may be made an arterial highway, in which case the signals will always be returned to that highway after a proper display period on the other highway. To render one highway an arterial highway, the cam 15 is rotated to close the switch 16. When the switch 16 is closed and the switch 16' is open, the "Go" display will always return to highway Y after a display on highway X. For example if the cams are in the position shown in Figure 14 of the drawings, and the display period for the "Go" signal on highway X has expired, permitting the switch C' to drop into its normal position, a circuit is created from line wire P through impulse switch 215 through the conductor 263, manual switch 216, conductor 260, cam switch 162, conductor 259, magnet 35, conductor 262 and adjustable limiting switch 107 to the line wire N. The solenoid 35 is then energized, advancing the ratchet wheel 22 and closing a circuit through the fixed limiting switch J.

When the switch J is closed a circuit is formed through contacts 100, conductor 285, normally closed contacts 133', conductor 284, and magnet 125, the other terminal of which is connected to line wire P. The main switch C is then energized closing a motor circuit from line wire N through contacts 136 and 135, conductor 260, cam switch 163 and conductor 256, to cam motor 177, the other terminal of which is connected to line wire P. As a result the motor 177 acts to return the "Go" signal display to highway Y in the manner previously described.

The display of the "Go" signal on the arterial highway for a predetermined length of time is insured by the impulse creating unit E. It will be seen that when the main switch C is energized an independent circuit is closed from line wire P through impulse switch 215, conductor 263, switch 16, conductor 269, contacts 139, conductor 261, magnet 35, conductor 262, and limiting switch 107 which is connected to line wire N. As a result the magnet 35 is energized at equal intervals throughout a predetermined length of time until the stub shaft 101 actuated by the ratchet wheel 22 engages the adjustable limiting stub switch 107. The breaking of the switch 107 breaks the circuit to the magnet 35, thus preventing the cam 32 from being further advanced.

Simultaneously a circuit is closed from line wire P through impulse producing switch 213, conductor 290, magnet 79, conductor 289, contacts 132, conductor 283, and contacts 134' and 136' to line wire N. As a result the magnet 79 is likewise actuated at regular intervals by the cam 32 and maintained in advance of the gripping device 65 until movement of the cam is arrested by the limiting switch 107. Shortly thereafter, the ratchet wheel 60 will advance the gripping device 65 into a position to swing the roller 77 into contact with the dog 55, releasing the ratchet wheel 22 and immediately thereafter releasing the ratchet wheel 60 in the manner which has been described. The main switch C is then returned to its normal position and the controller is subject to actuation by vehicles which have approached the intersection during the display of the "Go" signal on highway Y, or which later approach the intersection on highway Y. In other words, the "Go" signal is always displayed on highway Y until interrupted by the approach of a vehicle on highway X.

In the event a number of vehicles approach the intersection on highway X, the "Go" display signal thereupon may be prolonged throughout its maximum period in the manner previously described. Furthermore should vehicles approach the intersection just prior to the relinquishment of the "Go" signal on highway X and are too late to cross the intersection, the magnet 35' will be actuated, thereby causing a return of the "Go" signal to highway X at the termination of the predetermined display time on highway Y.

I have described the operation of my controller as a semi-traffic actuated apparatus which will always return to a through street or arterial highway. The timer may also be adjusted so that highway X serves as the arterial highway. In this arrangement the contacts 16 of the manually operated switch F are broken and the contacts 16' of the switch F' are closed.

If the "Go" signal is displayed on the signals SX and has been on display for at least the predetermined interval awarded highway X for "Go" display thereupon, a vehicle approaching the intersection on highway Y will close a circuit from line wire P through terminal 220, conductor 217, detector DY, conductor 216, terminal 219, conductors 257 and 260, cam switch 166, conductor 259, conductor 261, magnet 35, and conductor 262 to the limiting switch 107, the other terminal of which is connected to line wire N. Thus the vehicle crossing the detector DY energizes the magnet 35, advancing the prolonging ratchet wheel 22, closing a circuit through the switch 100. This closes a circuit from line wire N, through switch 100, conductor 285, contacts 133', conductor 284, and magnet 125, the other terminal of which is connected to the line wire P. The magnet 125 is thus energized, actuating the main switch C.

Actuation of the main switch C acts in the manner previously described to close a circuit through contacts 136 and 135, and through cam switch 163 which starts the cam motor 177 into operation. The cams act to change the signals in a manner to provide a "Go" display on highway Y, and a "Stop" signal on highway X.

Vehicles actuating the detector DY soon after the first actuation above mentioned will act to prolong the "Go" display on highway Y up to the predetermined maximum period as previously described. However, as soon as the resetting ratchet wheel 60 has advanced the necessary distance to award sufficient time to highway Y to allow vehicles to transverse the intersection, the timer unit B releases the ratchet wheels 22 and 60, allowing them to return to starting position.

This action breaks the circuit through the switch 100, thus de-energizing the magnet 125 and allowing the main switch to return to inoperative position. As soon as the switch C drops into its normal position, the circuit is closed from the line wire P through the impulse switch 215, conductor 264, manually operable switch 16', conductor 267, cam operated switch 167, conductor 266, magnet 35', conductor 270, and limiting switch 107', the other terminal of which is connected to the line wire N. The magnet 35' is then energized with an impulse created in the impulse producing unit E and the magnet 35 continues to receive regularly spaced impulses until the ratchet 22' advances it associated cam 32' to a point where the stub shaft 101' engages the limiting switch 107' to break the circuit therethrough. No further impulse will then be received by the magnet 35'.

Upon actuation of the magnet 35', a circuit previously described will be closed through contacts 133 of the switch C to the magnet 125' of the main switch C', thus actuating the main switch C and closing the accompanying contacts. A circuit is then closed from the line wire P through the impulse switch 213, conductor 290, conductor 292, magnet 79', conductor 291, switch contacts 132', conductor 282, contacts 134 and and 136, the latter of which is connected to the line wire N. Therefore simultaneously with the actuation of the impulse switch 215 to advance the magnet 35' at timed intervals, the circuit just described is closed through the impulse switch 213, acting to advance the resetting magnet 79' to advance the gripping device 65 into position to reset the ratchet wheel 22'.

As will be understood the raising of the main switch C' acts to close a circuit through contacts 136' and 135' from the line wire N through the cam switch 164 to the cam motor 177 operating the cams through 180° and returning the "Go" signal to highway X. The "Go" signal will remain on highway X at least throughout the predetermined period determined by the initial period adjusting arm L and the adjustable limiting switch K. At the end of this fixed display period on highway X, the ratchet wheels 22' and 60' will be returned to their initial position and the "Go" signal will remain on highway X in the absence of traffic on highway Y. However, if traffic has approached the intersection too late to cross the intersection before the signal was removed from highway Y before the "Go" signal was relinquished on highway Y, or if traffic has approached the intersection on highway Y during the fixed display period of the "Go" signal on highway X, this traffic will have actuated the prolonging magnet 35 so as to again switch the signal to highway Y when both main switches C and C' are in their normal positions.

If desired my controller may be set to display a "Go" signal on both highways at regularly timed intervals as determined by the initial period adjustment L and the prolonging period adjustment K. In such an event both of the manually operated switches F and F' are positioned to close the corresponding contacts 16 and 16'. If, for example, the signal is displaying a "Go" signal on highway X, a circuit is closed from the line wire P through the impulse switch 215, conductor 264, switch 16', conductor 267, cam switch 167, conductor 266, magnet 35', conductor 270, and switch 107', which is connected to the line wire N. Thus the switch 215 provides impulses at regularly timed intervals to the magnet 35', advancing the ratchet wheel 22' and its associated cam 32' until the limiting switch 107' is broken, thus opening the circuit to the magnet 35'. Simultaneously a circuit is closed from the line wire P through the switch 213, conductor 290, conductor 292, magnet 79', conductor 291, contacts 132', conductor 282, and contacts 134 and 136 to line wire N. The magnet 79' is thus also actuated at timed intervals by the impulse switch 213 until the gripping device carried by the ratchet wheel 60' acts to release both ratchet wheels 22' and 60' in the manner described.

During the display of the "Go" signal on highway X, the main switch C' has been actuated. As soon as the switch 100' is opened by the return of the magnets to the starting positions, a circuit is closed from the line wire N through the switch blades 107, conductor 262, magnet 35, conductor 261, conductor 259, cam switch 166, conductor 260, switch 16, conductor 263, to impulse switch 215, the other terminal of which is connected to the line wire P. As a result the magnet 35 is actuated at spaced intervals until the limiting switch 107 is broken to close the circuit thereto.

Actuation of the magnet 35 forms a contact through the switch 100 closing a circuit from the line wire N through the switch 100, conductor 285, contacts 133', conductor 284, and magnet 125, the other terminal of which is connected to the line wire P. The main switch C is thus actuated closing a circuit through the contacts 136 and 135 to the switch 163 which is closed at the time, and which starts the motor 177 into operation to change the signals to display "Go" on highway Y.

The resetting magnet 79 is actuated at regularly spaced intervals through the impulse switch 213, advancing the ratchet 60 until the gripping device 65 carried thereby actuates the dog releasing mechanism for the ratchet wheels 22 and 60, allowing these wheels to return to their starting position and opening the switch 100. Opening of the switch 100 de-energizes the magnet 125, allowing the switch C to return to its normal position. In this position, however, a circuit is closed through the cam switch 167 from the impulse producing switch 215 to the magnet 35'. Actuation of the magnet 35' acts in the manner previously described to actuate the main switch C' and to start the cam motor 177 in operation to change the "Go" signal to display "Go" on highway X. This alternate operation of the signal continues as long as the switches F and F' are set for automatic operation.

While I have described the signals 250 and 253 as "Walk" signals, they may also serve as a preliminary warning that the signal is about to change. It will be noted that the signals 250 and 251 change in advance of the amber warning signals, and can thus serve as a notice to motorists that the signal will change within a short space of time. Such a signal is particularly desirable in areas where pedestrians cross the intersection at infrequent intervals.

I have described the principles of construction and operation of my timer and have also described certain specific sequences which may take place during the operation of my controller. Obviously the sequence of events may vary somewhat, but from the foregoing description the operation of the controller is believed obvious.

I have found that in some instances, the friction clutch device for resetting the ratchet wheels may not function to the best advantage. If desired a more positive type of clutch may be used in place of the clutch suggested.

Figure 27:
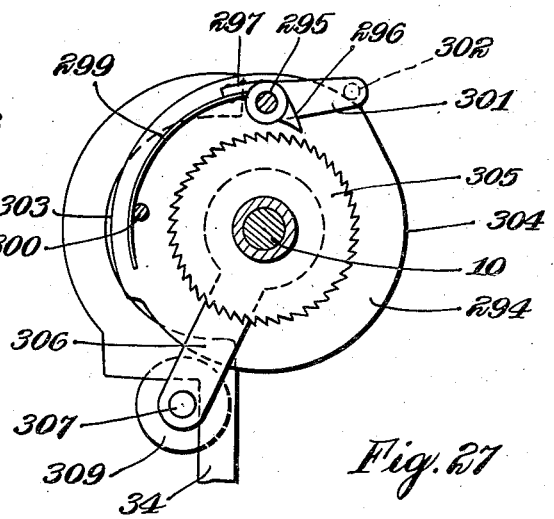
Figure 27 is a view similar to Figure 9, showing a slightly different form of resetting device.

In Figure 27 of the drawings I disclose a modified form of clutch construction which may be used in place of the friction clutch described. In this construction the ratchet wheel 22 drives the cam 294 which is identical to the cam 32 previously described. The ratchet wheel 60 (not illustrated in the drawing) carries a pivot 295 upon which a ratchet or pawl 296 is supported. A finger 297 projects from one side of the pawl to serve as a means of connecting the pawl to a spring 299. The spring 299 is anchored to the ratchet 60 by means of a pin 300 or other suitable means. The pawl 296 is provided with an arm 301 projecting therefrom for carrying a pin 302 or roller engageable with the outer surface of the cam 294. The cam 294 is provided with a large diameter portion 303 and a reduced diameter portion 304. When the pin 302 is engaged with the large diameter portion, the point or part of the pawl which engages the ratchet wheel is spaced from the surface of the ratchet wheel 305. The ratchet wheel 305 is freely rotatable upon the shaft 10 and is provided with an arm 306 connected thereto to carry a shaft 307 upon which is mounted the roller 309 which acts to disengage the dog holding the prolonging ratchet wheel from reverse rotation. However, when the pin or roller 302 moves toward the reduced diameter portion 304 of the cam 294, the point of the pawl 296 engages a tooth of the ratchet wheel 305, acting to positively connect the ratchet wheel 305 for rotation with the ratchet wheel 70 supporting the pawl 296. Such action tends to rotate the arm 306 and the shaft and roller supported thereby in a clockwise direction as viewed in Figure 27, thus releasing the ratchet dog of the prolonging ratchet in the manner previously described.

Figure 28:
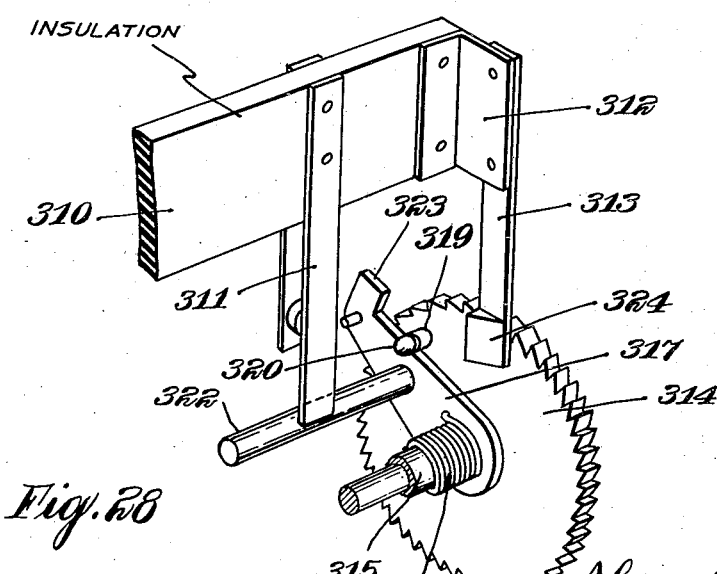
Figure 28 is a perspective view of a modified form of adjustable limiting switch apparatus.

In Figure 28 of the drawings I disclose a slightly different way of operating the adjustable limiting switch K. In the previously described construction a rather fine adjustment of the ratchet pawl is necessary to swing the stub shaft 101 into contact with the switch blades 107 due to the fact that as soon as the switch blades 107 are broken, the magnet urging the pawl 85 in a rotative direction is de-energized. Thus with the construction previously described inertia or momentum is depended upon to complete the movement of the ratchet to open the limiting switch K.

In the construction shown in Figure 28 of the drawings, the insulation block 101 of the switch K is replaced by a somewhat longer insulation block 310 which is supported in the same manner as the block 101. The block 310 supports the limiting switch 311 which is identical to the switch 107 previously described. An angle bracket 312 is mounted at the outer end of the block 310 and a spring blade 313 is mounted upon the angle bracket to project downwardly therefrom in close proximity to the ratchet wheel 314 which takes the place of the ratchet wheel 22 of the previously described construction. The ratchet wheel 314 is connected to a cam such as 32, not illustrated in the drawings, by means of a sleeve 315. An arm 317 is rotatably supported upon the sleeve 135 adjacent the ratchet 314. A pin 319 having an inclined outer end 320 projects laterally from the ratchet wheel 314 in the path of rotary movement of the arm 317. A spring 321 is provided about the sleeve 315 for holding the arm 317 against the pin 319. The arm 317 supports a stub shaft 322 which takes the place of the stub shaft 101 of the previously described construction and serves a similar purpose. The stub shaft 322 is engageable with one of the contacts of the switch 311 to open this switch.

The spring arm 313 is normally in the path of movement of the end 323 of the arm 317 so that as the ratchet 314 and arm 317 rotate, the end of the arm 323 engages against the edge of the spring arm 313. This action temporarily arrests movement of the arm 317 and the shaft 322 supported thereby. The arm 311 engages the spring arm 313 before the stub shaft 322 engages the switch contact 311 to open this switch.

Further rotation of the ratchet 314 brings the inclined end 320 of the pin 319 into engagement with the beveled or inclined end 324 of the spring blade 313. As a result the spring blade 313 is bent outwardly away from the ratchet wheel 314 until the edge of the blade 313 is disengaged from the end 323 of the arm 317. As soon as the arm and blade are disengaged the spring 321 acts to rotate the arm 317 against the pin 319, simultaneously engaging the contact 311 to open this switch.

From the foregoing explanation, it will be seen that the ratchet is thus provided with a lost motion device which relies upon spring means to suddenly open the switch 311. A snap switch is thus provided which is in many ways preferable to the type of switch previously described.

In accordance with the patent statutes, I have described the principles of construction and operation of my controller, and while I have endeavored to set forth the best embodiments thereof, I desire to have it understood that obvious changes may be made within the scope of the following claims without departing from the spirit of my invention.

I claim:
1. A vehicle actuated controller for controlling signal lights at the intersection of two highways, comprising signal changing means in said controller for changing the "Go" display, switch means controlling said signal changing means, timer unit means controlling said switch means, traffic actuated means operable by traffic approaching the intersection on at least one highway for actuating said timer unit to display a "Go" signal to said approaching traffic for a predetermined period of time, a step-by-step resetting device for de-energizing said timer unit, and means actuating said resetting device step-by-step throughout said predetermined period.

2. A vehicle actuated controller for controlling signal lights at the intersection of two highways, comprising signal changing means in said controller for changing the "Go" display, switch means controlling said signal changing means, timer unit means controlling said switch means, traffic actuated means operable by traffic approaching the intersection on at least one highway for actuating said timer unit to display a "Go" signal to said approaching traffic for a predetermined period of time, means forming a part of said timer unit operable in steps and responsive to continuing traffic on said one highway to prolong said predetermined period, a step-by-step resetting device for de-energizing said timer unit, and means actuating said resetting device step-by-step throughout said predetermined period.

3. A vehicle actuated controller for controlling signal lights at the intersection of two highways, comprising signal changing means in said controller for changing the "Go" display, switch means controlling said signal changing means, timer unit means controlling said switch means, traffic actuated means operable by traffic approaching the intersection on at least one highway for actuating said timer unit to display a "Go" signal to said approaching traffic for a predetermined period of time, means forming a part of said timer unit operable in steps and responsive to continuing traffic on said one highway to prolong said predetermined period an equal increment of time for each traffic actuation, a step-by-step resetting device for de-energizing said timer unit, and means actuating said resetting device step-by-step throughout said predetermined period.

4. A vehicle actuated controller for controlling signal lights at the intersection of two highways, comprising signal changing means in said controller for changing the "Go" display, switch means controlling said signal changing means, timer unit means controlling said switch means, traffic actuated means operable by traffic approaching the intersection on at least one highway for actuating said timer unit to display a "Go" signal to said approaching traffic for a predetermined period of time, means forming a part of said timer unit operable in steps and responsive to continuing traffic on said one highway to prolong said predetermined period an equal increment of time for each traffic actuation, means for limiting the prolongation of said predetermined period, a step-by-step resetting device for de-energizing said timer unit, and means actuating said resetting device step-by-step throughout said predetermined period.

5. A vehicle actuated controller for controlling signal lights at the intersection of two highways, comprising traffic actuated means operable by traffic approaching the intersection on at least one of said highways, means in said controller for changing the "Go" display signal from one of said highways to the other, switch means actuated for controlling the operation of said signal changing means, timer unit means responsive to actuations of said traffic actuated means and for operating said switch means, said timer unit means being operable upon actuation to change the signals and to hold the "Go" signal displayed on the highway having the actuated traffic actuated means for a predetermined period, prolonging means forming a part of said timer unit operable step-by-step upon each successive operation of said traffic actuated means within said predetermined period to prolong said predetermined period, means carried by said last named means for normally opening the circuit to said switch means when said last named means is in starting position and closing the circuit to said switch means when said last named means is out of starting position, means for returning said last named means to starting position.

6. A vehicle actuated controller for controlling signal lights at the intersection of two highways, comprising traffic actuated means operable by traffic approaching the intersection on at least one of said highways, means in said controller for changing the "Go" display signal from the other of said highways to said one highway, switch means controlling said signal changing means, a timer unit including a timer switch controlling said switch means, means forming part of said timer unit responsive to actuations of said traffic actuated means, and operable to hold said timer switch closed for a predetermined period to hold the "Go" signal on said one highway for said predetermined period, means forming a part of said timer unit for prolonging said predetermined period, and means for limiting said predetermined period, and means for resetting said timer switch actuating means to break the circuit through said timer switch.

7. A vehicle actuated controller for controlling signal lights at the intersection of two highways, said controller including traffic actuated means operable by traffic approaching the intersection on one of said highways, signal changing means in said controller for changing the "Go" display signal from either highway to the other, means actuated by traffic actuated means for operating said signal changing means and for holding the "Go" signal in changed position for a predetermined time, means for de-energizing said means actuated by said traffic actuated means, a second timer means operable upon de-energization of said means actuated by said traffic actuated means for operating said signal changing means to display the "Go" signal on the other highway and for holding the "Go" signal on the other highway for a second predetermined period of time, means forming a part of said second timer means and operable step-by-step for prolonging said second predetermined period of time to a predetermined maximum, and means for de-energizing said second timer means at the conclusion of the prolonged second predetermined period.

8. A vehicle actuated controller for controlling signal lights at the intersection of two highways, said controller including traffic actuated means operable by traffic approaching the intersection on one of said highways, signal changing means in said controller for changing the "Go" display signal from either highway to the other, means actuated by traffic actuated means for operating said signal changing means and for holding the "Go" signal in changed position for a predetermined time, means forming a part of said last named means and responsive to additional actuations of said traffic actuating means within said predetermined time to extend said predetermined time, means for de-energizing said means actuated by said traffic actuated means, a second timer means operable upon de-energization of said means actuated by said traffic actuated means for operating said signal changing means to display the "Go" signal on the other highway and for holding the "Go" signal on the other highway for a second predetermined period of time, means forming a part of said second timer means and operable step-by-step for prolonging said second predetermined period of time to a predetermined maximum, and means for de-energizing said second timer means at the conclusion of the prolonged second predetermined period.

9. A vehicle actuated controller for controlling signal lights at the intersection of two highways, said controller including traffic actuated means operable by traffic approaching the intersection on one of said highways, signal changing means in said controller for changing the "Go" display signal from either highway to the other, means actuated by traffic actuated means for operating said signal changing means and for holding the "Go" signal in changed position for a predetermined time, means forming a part of said last named means and responsive to additional actuations of said traffic actuating means within said predetermined time to extend said predetermined time, and means for limiting the prolongation of said predetermined time, means for de-energizing said means actuated by said traffic actuated means, a second timer means operable upon de-energization of said means actuated by said traffic actuated means for operating said signal changing means to display the "Go" signal on the other highway and for holding the "Go" signal on the other highway for a second predetermined period of time, means forming a part of said second timer means and operable step-by-step for prolonging said second predetermined period of time to a predetermined maximum, and means for de-energizing said second timer means at the conclusion of the prolonged second predetermined period.

10. A controller for controlling signal lights at the intersection of two highways, said controller including signal changing means for changing the "Go" display from either highway to the other, a timer unit for operating said signal changing means to change the signal from one highway to the other, a second timer unit controlling said signal changing means to change the signal from said other highway to said one highway, each said timer unit providing an initial period of time for a prolonged period of time for the display of the "Go" signal on its corresponding highway, and means forming a part of each timer unit and operable step-by-step to prolong the initial period through said prolonging period, and means for de-energizing said last named means at the end of said maximum period.

11. A vehicle actuated controller for controlling signal lights at the intersection of two highways, said controller including signal changing means for changing the "Go" display signal from either highway to the other, a timer unit for each highway controlling the duration of the "Go" display period for that highway, resetting means forming a part of each timer unit for resetting said timer unit at the end of said predetermined periods, each said resetting device comprising a means operable step-by-step by electrical impulses, and means in said controller providing electrical impulses to said resetting devices.

12. A controller for controlling signal lights at the intersection of two highways, said controller including signal changing means for changing the "Go" display signal from either highway to the other, a timer unit for each highway operable to hold the "Go" signal displayed on its corresponding highway for a predetermined time, each said timer unit being connected to said signal changing means to operate the same, each said timer unit including means providing an initial display period and a prolonging period for the corresponding highway, impulse actuated means for prolonging the signal display through said prolonging period of each timer unit, impulse operated resetting means for resetting each timer unit after said prolonging period has reached a predetermined maximum, means for setting each timer unit to limit the prolongation of its predetermined period, and means in said controller for producing timed impulses to actuate said impulse actuated devices.

13. A vehicle actuated controller for controlling signal lights at the intersection of two highways comprising signal changing means in said controller for changing the "Go" display, switch means controlling said signal changing means, timer unit means controlling said switch means, said timer unit means including a step-by-step mechanism, traffic actuated means operable by traffic approaching the intersection on at least one highway for operating said step-by-step mechanism, each vehicle actuating said mechanism one step, and a step-by-step resetting device for resetting said first named step-by-step mechanism, the time required by said resetting device for resetting said step-by-step mechanism depending upon the number of actuations of said step-by-step mechanism by traffic, and means for actuating said resetting device.

14. The structure defined in claim 13 in which said resetting device is set into motion by actuation of said step-by-step mechanism.

15. The structure defined in claim 13 including a limiting switch actuated by said step-by-step mechanism upon a predetermined number of actuations thereby to prevent further actuation thereof by traffic before the resetting operation.

16. A vehicle actuated controller for controlling signal lights at the intersection of two highways comprising signal changing means in said controller for changing the "Go" display, switch means controlling said signal changing means, timer unit means controlling said switch means, said timer unit means including a ratchet device including means for advancing the same a step at a time, traffic actuated means operable by traffic approaching the intersection on at least one highway for actuating said ratchet device and to actuate said switch means, said ratchet device being actuated a step at a time by each vehicle operating said traffic actuated means, a resetting device actuated by said ratchet device, movement of said ratchet device advancing said resetting device, and a second ratchet device for operating said resetting device to reset said first ratchet device, and impulse means for actuating said second ratchet device at fixed intervals.

17. The structure defined in claim 16 including a limiting switch actuated by said first named ratchet device to limit the operation thereof.

18. The structure defined in claim 16 in which the actuation of said first named ratchet device starts said second named ratchet device into operation.

19. A traffic signal timer for controlling signal lights at the intersection of two highways, comprising signal changing means in said controller for changing the "Go" display, motor means for actuating said signal changing means, a timing unit controlling said motor, traffic actuated means operable by traffic approaching the intersection and actuating said timer unit, said timer unit operating upon actuation to actuate said motor to change said signals, and operating to hold said motor from operation for a predetermined period.

20. The structure defined in claim 19 including means forming a part of said timer unit for prolonging the action of said timer unit in holding said motor from operation.

ALVIN O. OLAFSON.

REFERENCES CITED

The following references are of record in the file of this patent:

UNITED STATES PATENTS

| Number | Name | Date |
| --- | --- | --- |
| 2,045,136 | Haugh, Jr., et al. | June 23, 1936 |
| 2,050,637 | Tone | Aug. 11, 1936 |
| 2,088,697 | Geer | Aug. 3, 1937 |
| 2,088,723 | Preist | Aug. 3, 1937 |